US012385262B2

(12) United States Patent
Heath et al.

(10) Patent No.: US 12,385,262 B2
(45) Date of Patent: Aug. 12, 2025

(54) COLLAR MOUNT FOR A CELLULAR COMMUNICATIONS MONOPOLE

(71) Applicant: Outdoor Wireless Networks LLC, Claremont, NC (US)

(72) Inventors: Dale Richard Heath, Fort Worth, TX (US); Firoz Ahmed, Irving, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 1002 days.

(21) Appl. No.: 17/315,615

(22) Filed: May 10, 2021

(65) Prior Publication Data

US 2021/0376444 A1 Dec. 2, 2021

Related U.S. Application Data

(60) Provisional application No. 63/033,333, filed on Jun. 2, 2020.

(51) Int. Cl.

*E04G 5/06* (2006.01)
*E04G 5/04* (2006.01)
*H01Q 1/12* (2006.01)

(52) U.S. Cl.

CPC ............... *E04G 5/067* (2013.01); *E04G 5/04* (2013.01); *E04G 5/045* (2013.01); *H01Q 1/1242* (2013.01)

(58) Field of Classification Search

CPC ........... E04G 5/045; E04G 5/067; E04G 3/24; E04G 3/243; H01Q 1/1242; E06C 5/24

See application file for complete search history.

(56) References Cited

U.S. PATENT DOCUMENTS 5,467,955 A 11/1995 Beyersmith
5,963,179 A * 10/1999 Chavez .................... H01Q 3/06 343/765

(Continued)

FOREIGN PATENT DOCUMENTS

CN 203760622 U 8/2014
CN 207776407 U 8/2018

OTHER PUBLICATIONS

"International Preliminary Report on Patentability corresponding to International Application No. PCT/US2021/031736 mailed Dec. 15, 2022".

(Continued)

*Primary Examiner* — Daniel J Troy
*Assistant Examiner* — Susan M. Heschel
(74) *Attorney, Agent, or Firm* — Myers Bigel, P.A.

(57) ABSTRACT

A collar mount for a base station monopole has a plurality of pressure members that surround the monopole. Threaded members are connected between adjacent pressure members to tighten the pressure members against the monopole. Pressure plates of the pressure members have a forward edge configured to engage the monopole at a pressure point. A dispersement plate is positioned at the pressure point where the dispersement plate is non-rigidly connected to the pressure plates. A second threaded member may connect the upper pressure plates of each two adjacent pressure members together. Each of the pressure members may include a plurality of pressure plates where the pressure plates have a width direction extending parallel to the monopole and a thickness direction extending perpendicular to the width direction where the width direction is larger than the thickness direction.

18 Claims, 11 Drawing Sheets

(56) References Cited

U.S. PATENT DOCUMENTS

| | | | | |
|---|---|---|---|---|
| 6,342,870 | B1 * | 1/2002 | Mehrkens | H01Q 25/00 343/890 |
| 6,563,475 | B2 * | 5/2003 | Ianello | H01Q 1/1242 343/890 |
| 6,856,302 | B2 * | 2/2005 | Gonçalves | H01Q 1/1207 343/890 |
| 7,113,145 | B1 * | 9/2006 | Noble | H01Q 1/1228 343/890 |
| 10,526,803 | B2 * | 1/2020 | Franceschino | E04G 5/067 |
| 11,462,813 | B2 * | 10/2022 | Palmer | H01Q 1/125 |
| 2002/0053996 | A1 | 5/2002 | Ianello et al. | |
| 2011/0279347 | A1 * | 11/2011 | Pass | E04G 3/243 343/890 |
| 2016/0276732 | A1 | 9/2016 | Pass et al. | |
| 2020/0411945 | A1 | 12/2020 | Heath et al. | |

OTHER PUBLICATIONS

"International Search Report and Written Opinion corresponding to International Application No. PCT/US2021/031736 mailed Aug. 31, 2021".

* cited by examiner

COLLAR MOUNT FOR A CELLULAR COMMUNICATIONS MONOPOLE

RELATED APPLICATION

The present application claims priority from and the benefit of U.S. Provisional Patent Application No. 63/033,333, filed Jun. 2, 2020, the disclosure of which is hereby incorporated herein by reference in full.

BACKGROUND

The present invention generally relates to base station support structures for cellular communications systems and, more particularly, to an improved collar mount for such systems.

Cellular communications systems are well known in the art. In a cellular communications system, a geographic area is divided into a series of regions that are referred to as "cells" and each cell is served by abase station. The base station may include one or more base station antennas that are configured to provide two-way radio frequency ("RF") communications with mobile subscribers that are geographically positioned within the cells served by the base station. In addition to the antennas, base stations typically comprise a large number of components including remote radio units (RRU's), over voltage protection packages (OVP's), coaxial cables, fiber trunks, connectors, jumper cables, and a number of support components such as hangars, hoists, and junction boxes.

Typically, the antennas and related equipment are mounted outdoors. The antennas and related equipment are mounted on a structural support that is secured to a main structure. In one typical base station, the main structure comprises a tower or monopole and the structural support comprises a platform mounted to the monopole by a collar mount.

An improved collar mount for a base station support structure is desired.

SUMMARY

As a first aspect, embodiments of the invention are directed to a collar mount for a base station monopole. The collar mount comprises: at least one pressure plate having a forward edge configured to engage a monopole at a pressure point; and at least one dispersement plate positioned at the pressure point, the dispersement plate being non-rigidly connected to the pressure plate.

As a second aspect, embodiments of the invention are directed to a collar mount for a base station monopole comprising: a plurality of pressure members, each of the plurality of pressure members having a top end and a bottom end; a plurality of first threaded members connecting the plurality of pressure members, wherein at least one of the plurality of first threaded members is connected between each two adjacent pressure members of the plurality of pressure members and is positioned between the top end and the bottom end; and at least one second threaded member connecting each two adjacent pressure members of the plurality of pressure members, the at least one second threaded member being positioned at or above the top end.

As a third aspect, embodiments of the invention are directed to a collar mount for a base station monopole comprising: a plurality of pressure members; and a plurality of threaded members connecting the plurality of pressure members, wherein at least one of the plurality of threaded members is connected between each two adjacent pressure members of the plurality of pressure members. Each of the plurality of pressure members comprises a plurality of pressure plates where each of the plurality of pressure plates have a width direction extending parallel to the monopole and a thickness direction extending perpendicular to the width direction where the pressure plate is significantly larger in the width direction than in the thickness direction.

As a fourth aspect, embodiments of the invention are directed to a support for a monopole comprising: a collar mount for a base station monopole comprising at least one pressure plate having a forward edge configured to engage a monopole at a pressure point and at least one dispersement plate positioned at the pressure point, the dispersement plate being non-rigidly connected to the pressure plate; and a structural support connected to the collar mount.

As a fifth aspect, embodiments of the invention are directed to a base station support structure comprising: a monopole; a collar mount comprising at least one pressure plate having a forward edge configured to engage the monopole at a pressure point and at least one dispersement plate positioned at the pressure point, the dispersement plate being non-rigidly connected to the pressure plate; and a structural support connected to the collar mount.

DETAILED DESCRIPTION

Pursuant to embodiments of the present invention, a collar mount, also sometimes referred to as a ring mount, is provided for mounting a structural support to a monopole. The collar mount better supports the load of the antennas and related equipment and minimizes point loads on the monopole.

As base stations become more complex, the amount of technology incorporated into the antennas and the equipment carried by the structural support is increasing. The additional effective projected area (EPA) and weight of the equipment and larger collar mounts are increasing contact forces through the collar mount to the monopole. Monopole structures are typically round or polygonal in cross-section and are typically manufactured out of 3/16" formed or rolled plate.

Figure 1:
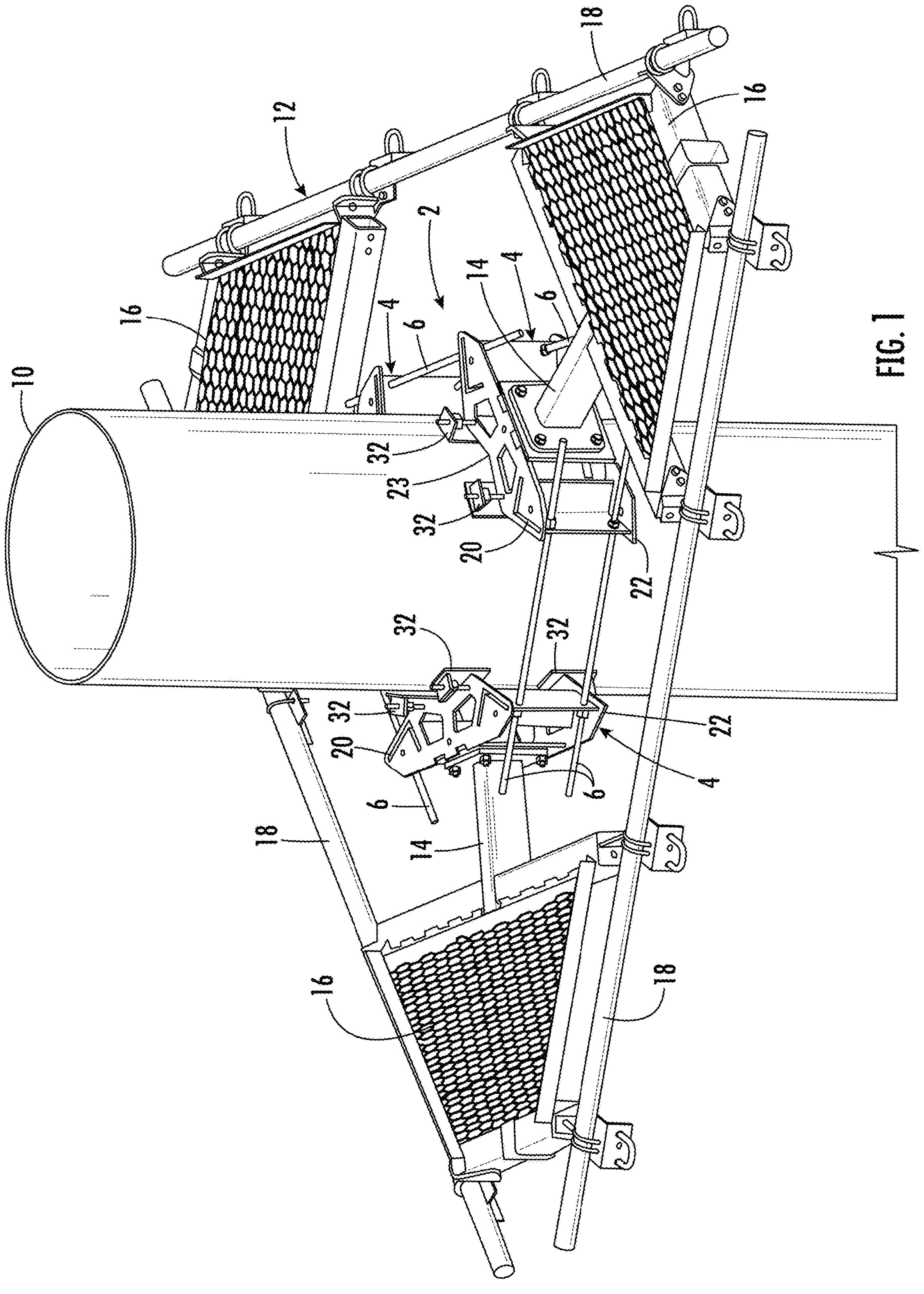
FIG. 1 is a perspective view of an exemplary collar mount according to embodiments of the present invention and associated structural support mounted on a monopole.
Figure 2:
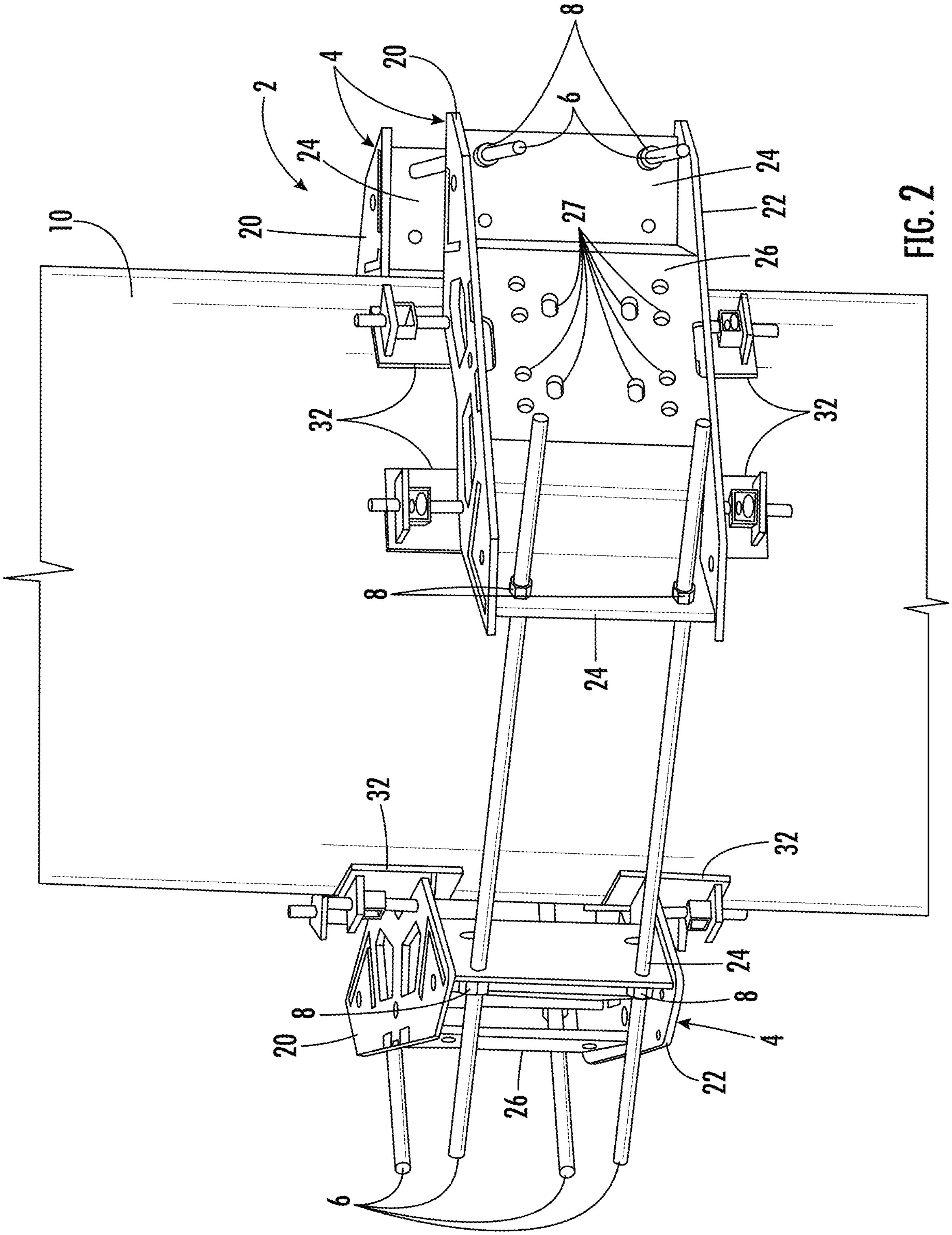
FIG. 2 is a detailed perspective view of the collar mount of FIG. 1 mounted on a monopole.
Figure 3:
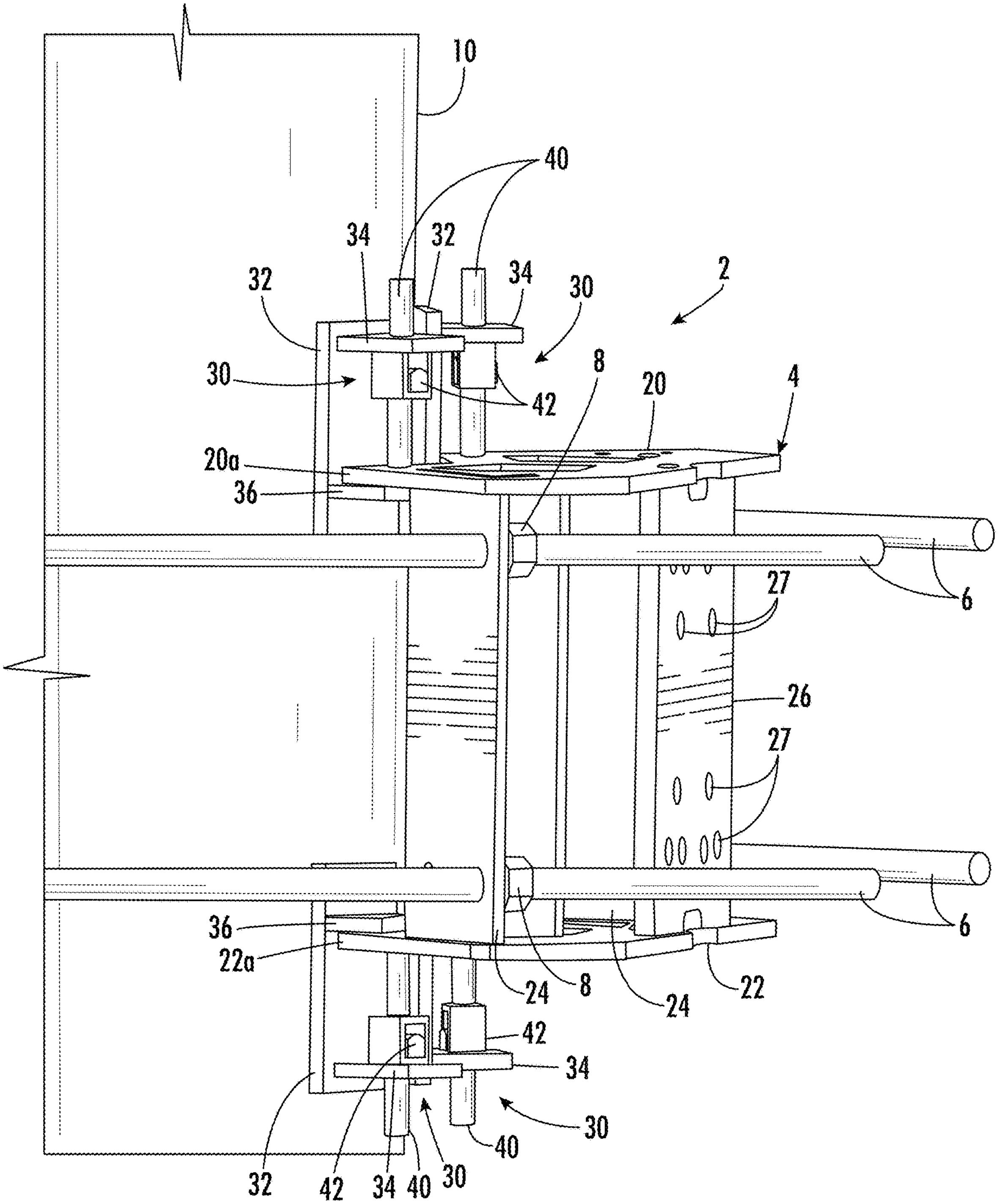
FIG. 3 is a detailed perspective view of a portion of the collar mount of FIG. 1 mounted on a monopole.
Figure 4:
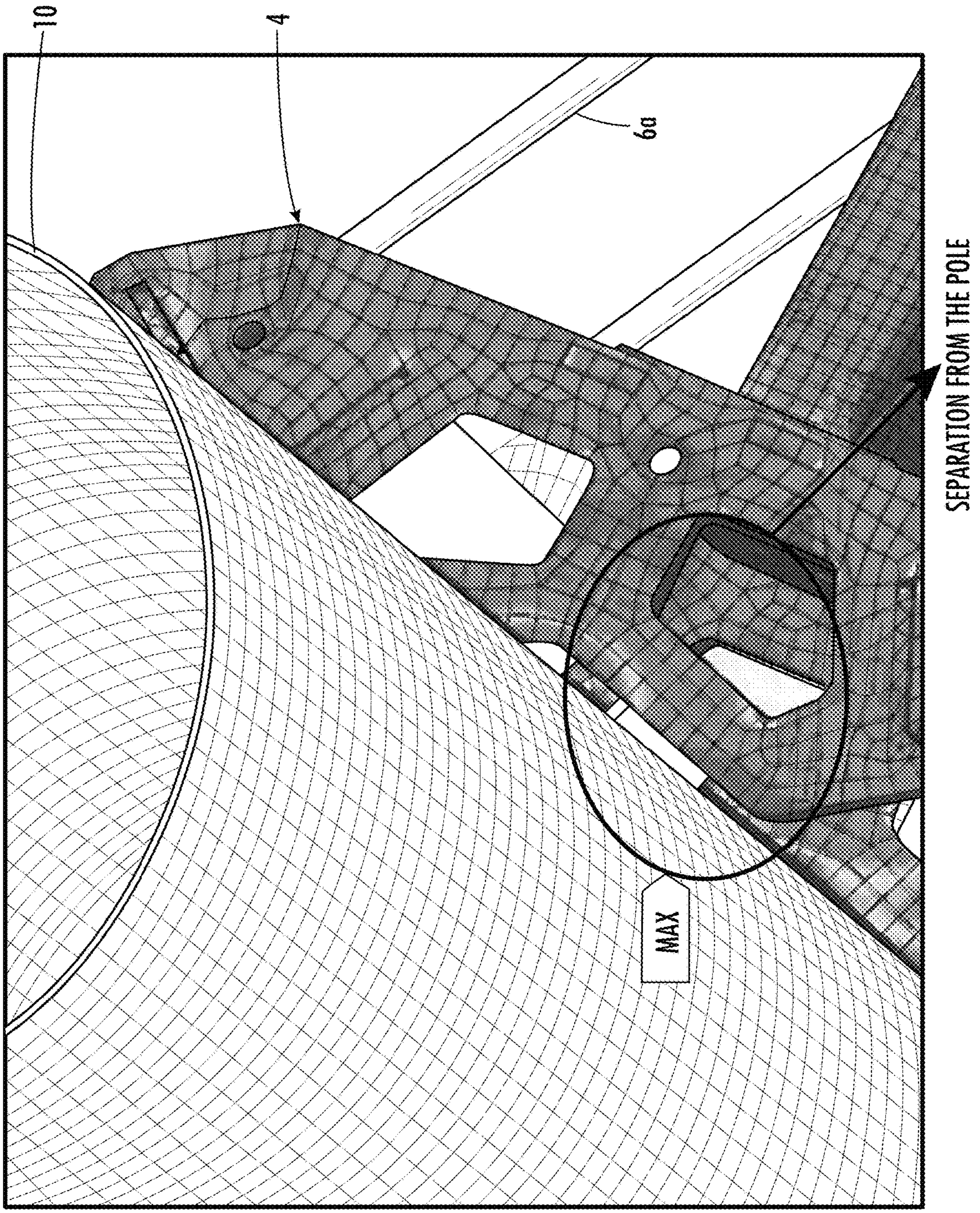
FIGS. 4 and 5 are top and bottom perspective views, respectively, of a legacy collar mount useful in illustrating the loads of a collar mount on a monopole.

An embodiment of a collar mount in accordance with the invention is shown in FIGS. 1 through 3. The collar mount 2 comprises a plurality of pressure members 4 where adjacent ones of the pressure members 4 are connected by threaded members 6. In the illustrated embodiment, three pressure members 4 are used where each pair of the adjacent pressure members 4 are connected by two threaded members 6. The threaded members 6 engage mating threaded connectors 8 such that the threaded connectors 8 may be threaded onto and off of the threaded members 6 to decrease or increase the spacing between the pressure members 4. The monopole 10 is located inside of the pressure members 4 such that the pressure members 4 may be tightened into engagement with the monopole 10 using threaded members 6 and threaded connectors 8 to secure the collar mount 2 to the monopole 10.

A structural support 12 is connected to the pressure members 4 by standoff arms 14. One embodiment of a structural support 12 is shown in FIG. 1 comprising a plurality of platforms 16 and poles 18. In a typical structural support 12, vertical poles (not shown) may be attached to the platforms 16 and/or horizontal poles 18 that support the antennas in a known manner. While one embodiment of a structural support 12 is shown, the structural support 12 may vary from that specifically shown in the drawings. Another example of a support structure is described in U.S. Patent Publication No. 2020/0411945, for a "Rooftop Sector Frame" by Heath et al., the contents of which is incorporated by reference herein in its entirety. The collar mount 2 as described herein may be used with any suitable type of structural support and the term "structural support" is not intended to be limited to the structural support 12 as shown in the drawings.

Figure 10:
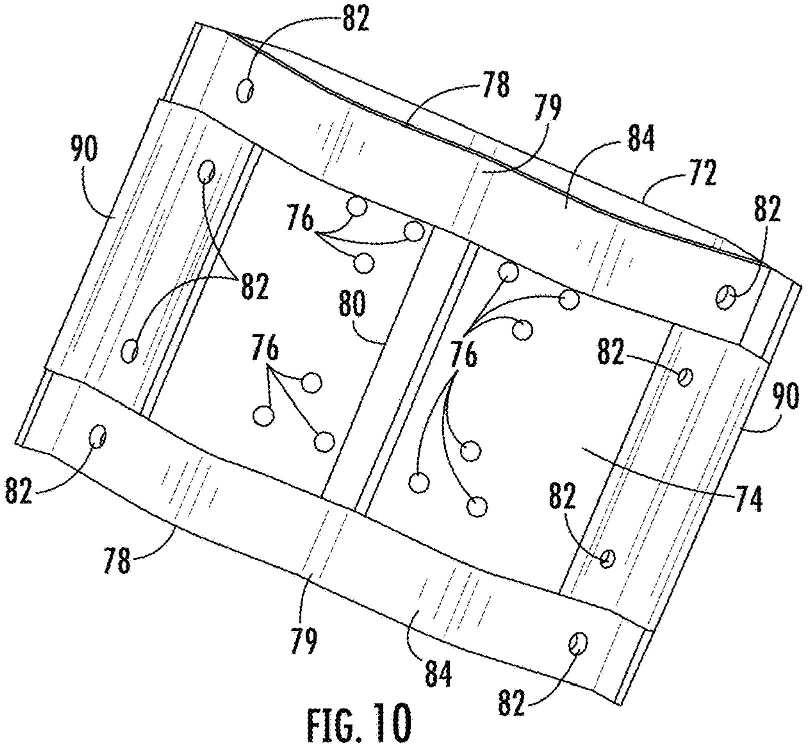
FIG. 10 is a perspective view of a modification of the pressure member of FIGS. 8 and 9.
Figure 11:
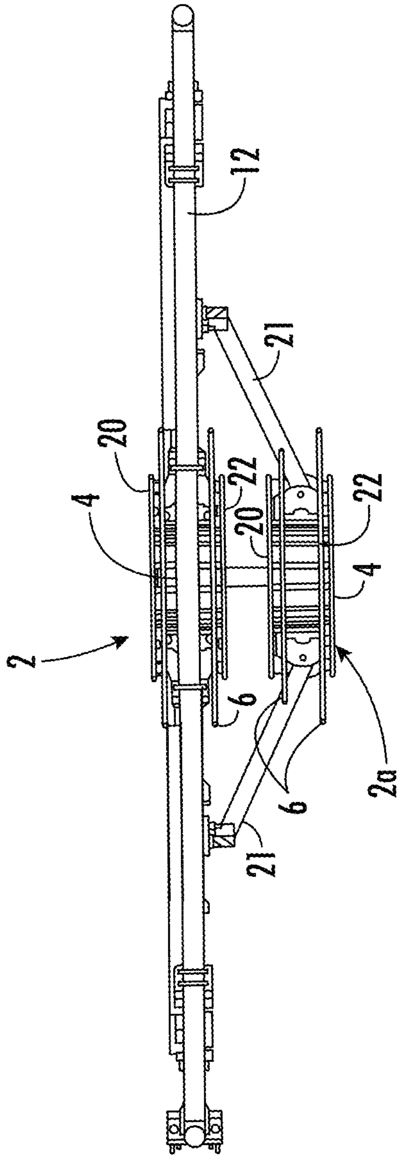
FIG. 11 is a side view of another embodiment of a collar mount.
Figure 12:
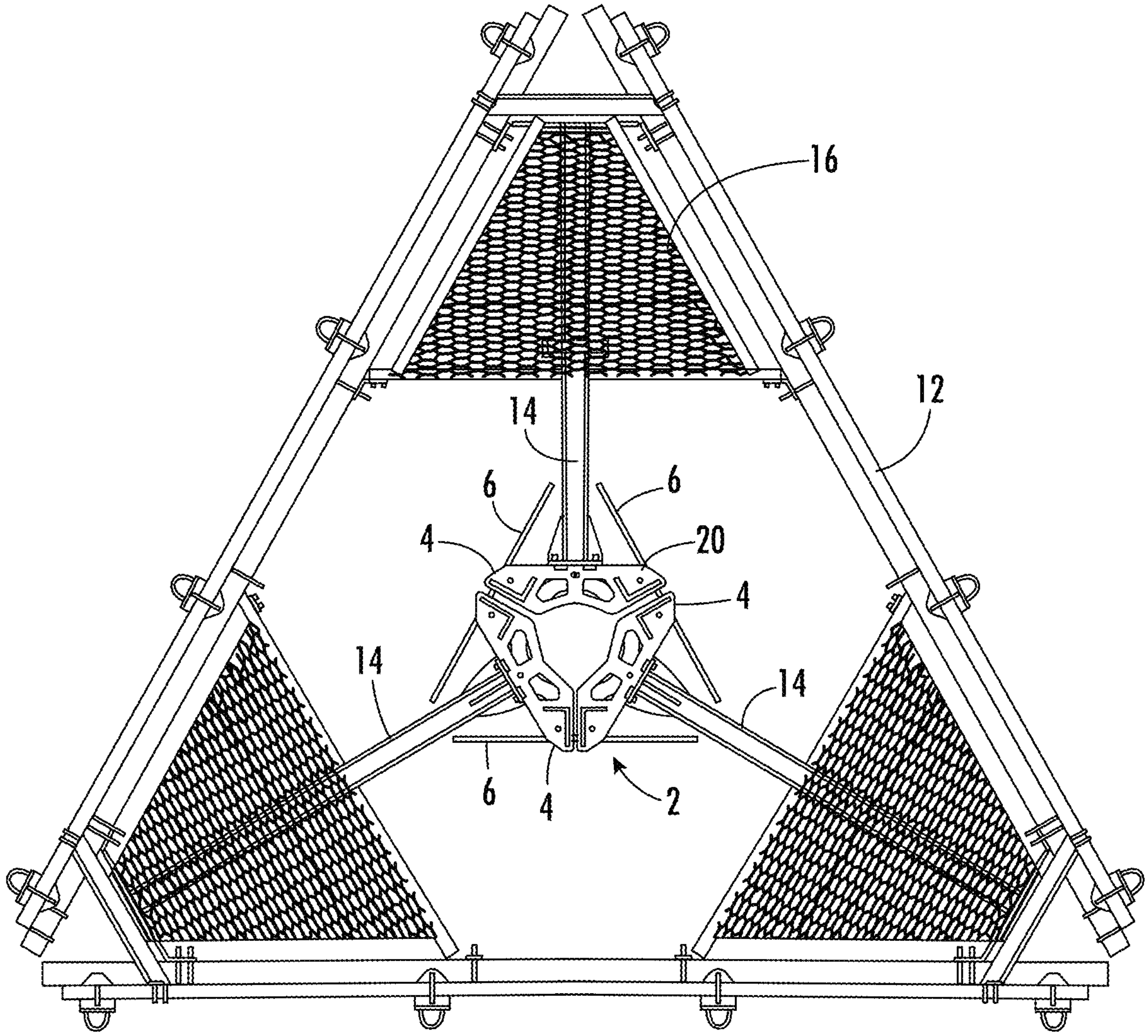
FIG. 12 is a top view of the embodiment of the collar mount of FIG. 11.
Figure 13:
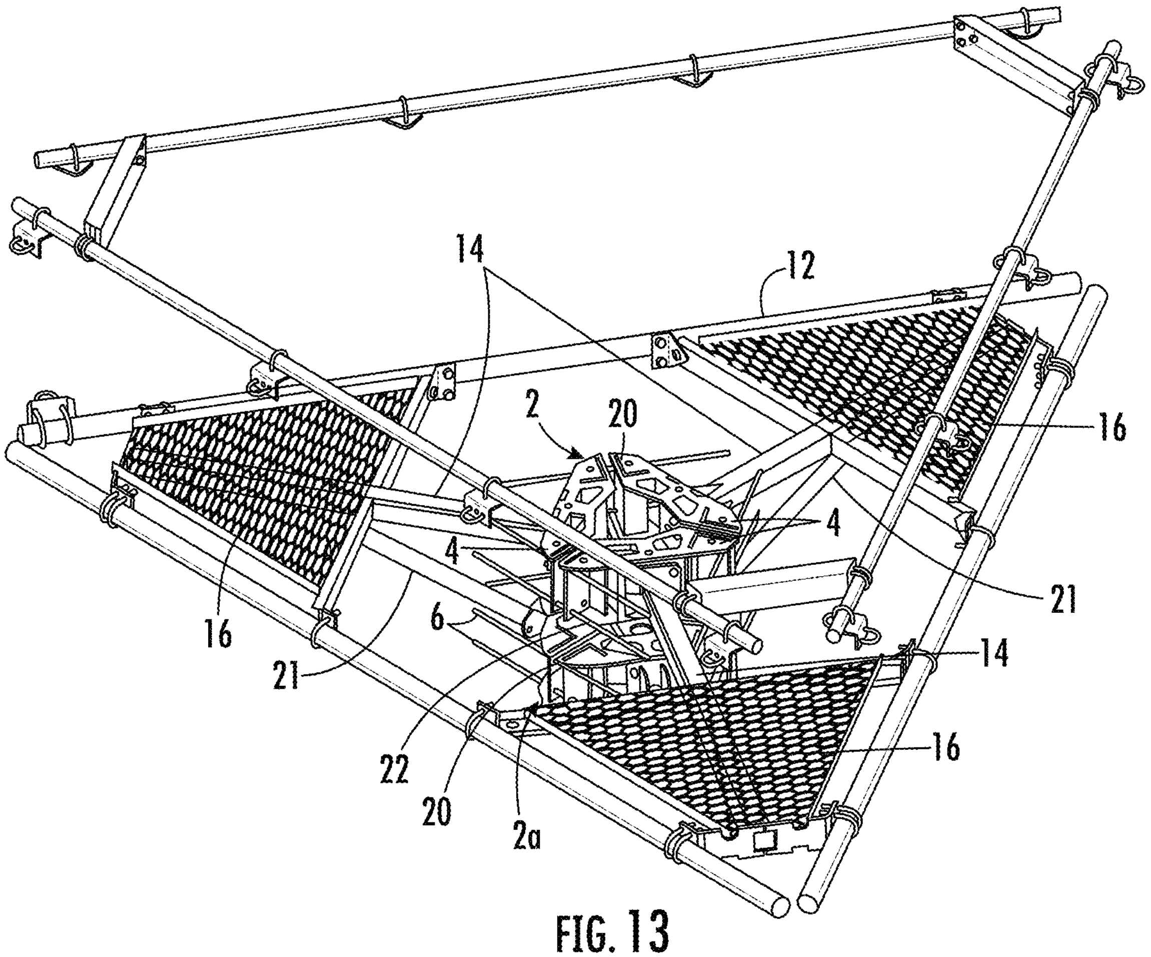
FIG. 13 is a perspective view of the embodiment of the collar mount of FIG. 11.

Another embodiment of a collar mount structure is shown in FIGS. 11 through 13. The collar mount structure of FIGS. 1I through 13 is similar to the collar mount of FIGS. 1 through 3 where the same reference numbers are used in FIGS. 11 through 13 to identify elements previously described with respect to FIGS. 1-3. In the embodiment of FIGS. 11 through 13, a plurality of kicker arms 21 are provided in addition to the standoff arms 14 to add additional support for the structural support 12. The kicker arms 21 are mounted to the pressure members 4 of a second collar mount 2*a* and the structural support 12. The kicker arms are rotatably adjustable relative to the structural support 12 and the second collar mount 2*a* such that the angle of the kicker arms 21 is adjustable. The second collar mount 2*a* and the kicker arms 21 may be used to support larger loads.

Figure 5:
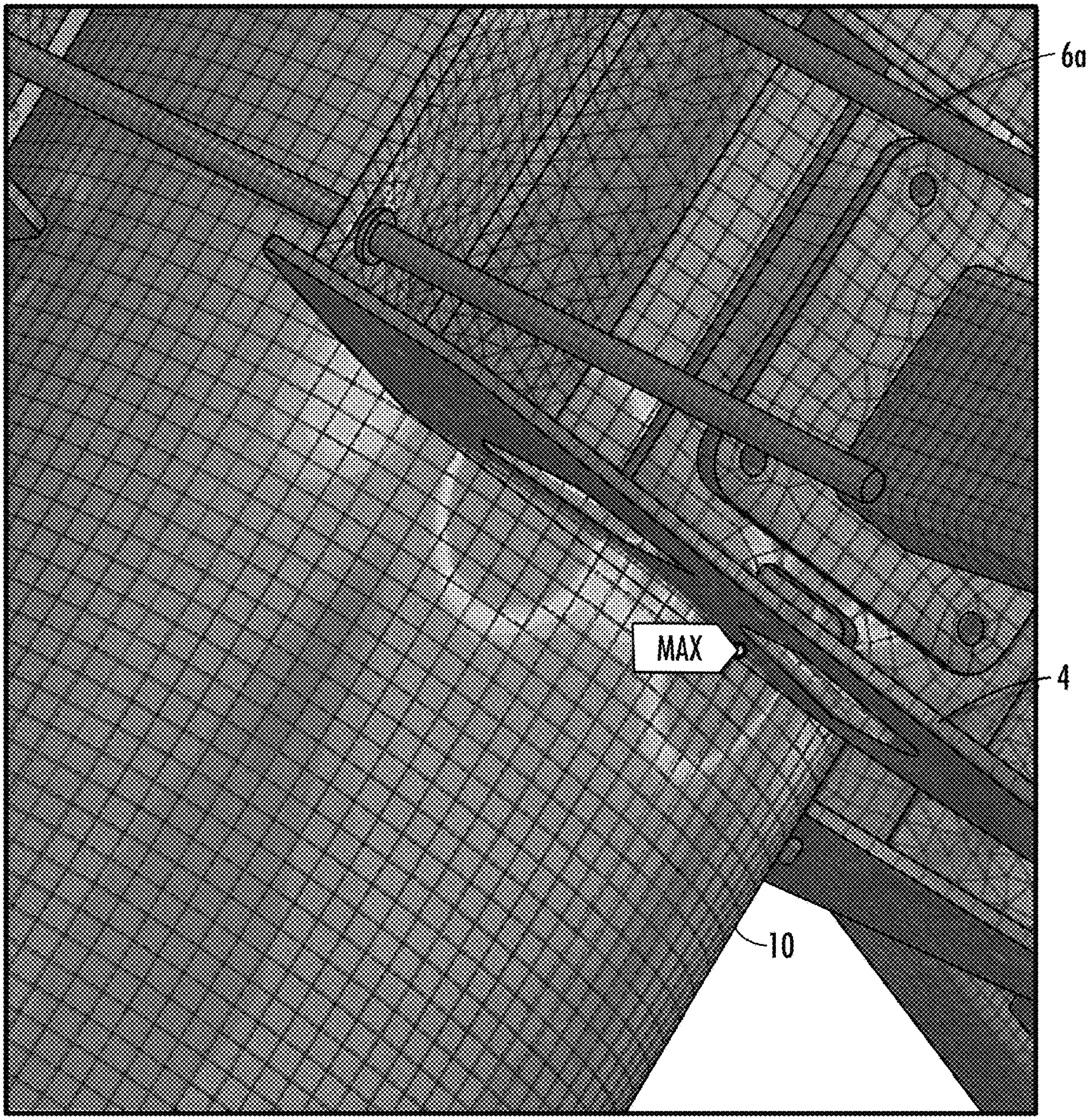

The inventors have discovered that legacy collar mounts may create unacceptably high point loads on the monopole. In legacy collar mounts, when the pressure members 4 of the collar mount 2 are tightened into engagement with the monopole 10, the collar mount 2 is held on the monopole 10 by a friction connection. As the weight of the equipment supported on the support structure 12 increases, the forces generated by the increased equipment weight and wind loads resulting from larger EPA's requires increased pre-tension at the connection between the supporting collar mount 2 and monopole 10. The bending moment on the collar mount 2 resulting from the load on the standoff arms 14 requires a very high pretension force in the threaded rods 6 to counter tilting of the collar mount 2 at the collar mount/monopole connection. The pretension force and bending moment create localized contact pressures at small areas of the monopole 10 which may cause a potential failure of the monopole due to local yielding and a stress higher than tensile strength of the material of the monopole 10. Moreover, as the load on the collar mount 2 increases, the top ends of the pressure members 4 can be forced away from and separate from the monopole 10 as show in FIG. 4. The tension in the top threaded rod 6*a* causes it to stretch and potentially exceed the yield or tensile strength of the material. The top ends of the pressure members 4 can be forced away from the monopole 10 when the moment created by the load on the structural support 12 is greater than the pretension load of the threaded rods 6. As the top end of the pressure member 4 is forced away from the monopole 10, the pressure member 4 tilts causing the lower edge of the pressure member 4 to "knife" into the monopole 10 as shown in FIG. 5. This causes point loads and localized stresses in the monopole 10. Because of the typical position of the antennas and radios at the farthest radial point on the support structure 12 from the monopole 10, a significant load is carried in tension to the lower edges of the pressure members 4 and into the monopole 10. These localized stresses may cause plastic deformation of the monopole 10 resulting in a possible failure of the entire mounting system.

While the monopole 10 may be modified to carry the larger load; modification of the monopole is expensive and time consuming. Embodiments of the collar mounts described below disperse the load on the monopole 10 and may be used with existing monopoles without the need to reinforce the monopole. Moreover, the system of the invention allows for the retrofitting of existing collar mounts.

Referring again to FIGS. 1 through 3, the collar mount 2 comprises a plurality of pressure members 4 spaced evenly about the periphery of the monopole 10 and connected by threaded members 6 as previously described. The pressure members 4 are substantially identical such that one of the pressure members 4 will be described in detail. The pressure member 4 comprises an upper pressure plate 20 defining the top end of the pressure member 4 and a lower pressure plate 22 defining the bottom end of the pressure member 4. The upper pressure plate 20 and lower pressure plate 22 extend substantially perpendicular to the wall of the monopole 10, which, in the typical installation, means that the upper pressure plate 20 and lower pressure plate 22 extend generally horizontally. The upper pressure plate 20 and lower pressure plate 22 are generally planar members having narrow forward edges 20*a* and 22*a*, respectively, that are configured to engage the outer surface of the monopole 10. The typical monopole 10 has a generally cylindrical shape that may be circular or polygonal in cross-section. In order to engage both styles of monopoles, the forward edges 20*a* and 22*a* of the upper pressure plate 20 and the lower pressure plate 22, respectively, may have a generally shallow V-shaped depression 23 (FIG. 1). The depression 23 allows the forward edges 20*a*, 22*a* to engage a monopole 10 having either a cylindrical wall or a polygonal cylindrical wall. However, in some embodiments, the forward edges 20*a*, 22*a* may be configured to mate with a specific style of monopole. Support beams 24 connect the upper pressure plate 20 to the lower pressure plate 22 and hold the pressure plates in spaced relationship. The support beams 24 may be connected to the upper pressure plate 20 and the lower pressure plate 22 using any suitable mechanism such as welding, bolts or the like. A support plate 26 is also connected between the upper pressure plate 20 and the lower pressure plate 22 such that the support plate 26 extends vertically between the upper pressure plate 20 and the lower pressure plate 22 and faces outwardly away from the monopole 10. The support plate 26 may be connected to the upper pressure plate 20 and the lower pressure plate 22 using any suitable mechanism such as welding, bolts or the like. At least one standoff arm 14 is connected to and extends from the support plate 26 and supports the structural support 12 on the collar mount 2. The standoff arm 14 may be connected to the support plate 26 using any suitable mechanism such as welding, bolts or the like. In the illustrated embodiment, the support plate 26 may include holes 27 for receiving bolts that connect the standoff arm 14 to the support plate 26.

The threaded members 6 extend between and engage each of the adjacent pressure members 4. In the illustrated embodiment, two threaded members 6 extend between and engage each of the adjacent pressure members 4. The threaded members 6 are inserted through apertures formed in the support beams 24. A threaded connector 8 engages each of the threaded members 6 and is disposed to the outside of the support beams 24. Rotation of the threaded connectors 30 in a first, tightening direction causes the pressure members 4 to move toward one another to tighten the collar mount 2 against the monopole 10. Rotation of the connectors 30 in a second, loosening direction allows the pressure members 4 to move away from one another to loosen the collar mount 2 from the monopole 10. When the pressure members 4 are tightened into engagement with the monopole 10, the collar mount 2 and/or collar mount 2*a* is fixed in position relative to the monopole 10.

As previously explained, the load on the support structure 12 tends to force the top end of the collar mount 2 and/or collar mount 2*a* away from the monopole 10 which can cause the bottom end of the collar mount 2 to knife into the monopole 10. To ameliorate this situation, the collar mount 2 and/or collar mount 2*a* uses non-fixed dispersement plates 32 to spread the load from the collar mount 2 over a wider area of the monopole 10 and/or to reduce the tilting of the collar mount 2 and related damage to the monopole 10. Specific reference will be made to collar mount 2 to describe the structure and operation of the dispersement plates 23, it being understood that the dispersement plates 32 may be used with the second collar mount 2*a* in the same manner. Each dispersement plate 32 comprises a relatively small, flat, rigid planar plate that is disposed between the points of contact of the upper and lower pressure plates 20, 22 and the monopole 10. In the illustrated embodiment, each of the upper pressure plate 20 and the lower pressure plate 22 would have two areas of contact with the monopole 10 such that each pressure member 4 uses four disbursement plates 32 with two disbursement plates 32 positioned between the upper pressure plate 20 and the monopole 10 and two disbursement plates 32 positioned between the lower pressure plate 22 and the monopole 10. The disbursement plates 32 alleviate the local point stresses by distributing the load over a greater area of the monopole 10 than the narrow edges 20*a*, 22*a* of the upper and lower pressure plates 20, 22, respectively. Using non-fixed dispersement plates 32 with the collar mount 2 better distributes the local stresses at the bottom end of the collar mount 2.

It has been determined that non-fixed dispersement plates 32 may work better than either fixed disbursement plates (i.e. plates that are permanently and rigidly fixed to the pressure plates 20, 22 such as by welding) or collar mounts having large, continuous pressure plates that engage the monopole 10. "Non-fixed" as used herein to describe the dispersement plates 32 means that the dispersement plates 32 and the collar mount 2 are not fixed to one another to thereby allow the collar mount 2 to be in a tilted position relative to the monopole (e.g. the upper pressure plate 20 and the lower pressure plate 22 may be in a position other than perpendicular to the monopole) yet the displacement plates 32 remain flush and parallel to the surface of the monopole to provide greater contact surface displacement. It is believed that fixed dispersement plates that are formed rigidly with the collar mount do not work as well as the non-fixed dispersement plates 32 because the fixed disbursement plates carry the load to the bottom of the collar mount. It is believed that simply using pressure plates with large, uninterrupted contact areas do not work as well as the non-fixed dispersement plates 32 because the pretension load generated by threaded members 6 that is required to secure such a design to the monopole is greater than capacity of the monopole. Moreover, simply using a separate large plate between the points of contact between the collar mount and the monopole does not work because the plate may separate from the collar mount 2 when the collar mount tilts under loads. The use of non-fixed dispersement plates 32 as described herein, in addition to reducing the stresses on the monopole, also has the added advantage of being able to be used in retrofit applications where the non-fixed disbursement plates 32 can be added to existing collar mounts.

Referring again to FIGS. 1 and 2, in one embodiment, each non-fixed dispersement plate 32 includes a connection mechanism 30 comprising a pair of opposed flanges 34, 36 and a threaded member 40. The opposed flanges 34, 36 extend substantially perpendicularly from the dispersement plate 32. When the disbursement plate 32 is in the installed position abutting the monopole 10, the flanges 34, 36 are disposed substantially parallel to the pressure plates 20 and 22. One of the flanges 34 receives threaded member 40 that may extend through an aperture in the flange 34. Threaded member 40 threadably engages a threaded connector 42. The threaded connector 42 is fixed to the flange 34 such that rotation of the threaded member 40 causes the threaded member 40 to move linearly toward and away from the opposing flange 36.

A dispersement plate 32 is mounted to one of the pressure plates 20, 22 at each potential point of contact between that pressure plate 20, 22 and the monopole 10. Specifically, the dispersement plate 32 is positioned such that the dispersement plate 32 abuts the monopole 10 and the forward edges 20, 22*a* of pressure plates 20, 22. The dispersement plate 32 is also positioned such that the pressure plates 20, 22 are positioned between the flanges 34, 36. The threaded member 40 is rotated such that is extended into engagement with the pressure plate 20, 22. As the threaded member 40 is tightened, the pressure plate 20, 22 is trapped between the threaded member 40 and the opposed flange 36. The use of the connection mechanism 30 fixes the disbursement plate 32 to the pressure member 4 during installation of the pressure plate 4 on the monopole 10 and if the pressure member 4 tilts. However, the use of the connection mechanism 30 holds the disbursement plates in position without rigidly fixing the disbursement plates 32 in position relative to the collar mount 2.

The use of the dispersement plates 32 and connection mechanism 30 also allows the dispersement plates 32 to be used with pressure plates 20, 22 that are disposed either horizontally, as shown in the figures, or vertically.

After the dispersement plates 32 are connected to the pressure plates 20, 22, the pressure members 4 are tightened into engagement with the monopole 10 using threaded members 6. When the pressure members 4 are tightened into engagement with the monopole 10 the dispersement plates 32 engage the monopole and are positioned at the location of the potential points of contact between the pressure plates 4 and the monopole 10. The use of the separate non-fixed pressure plates 32 spreads the forces on the monopole over a larger area on the monopole to prevent localized stresses that may damage and cause failure of the monopole.

While one connection mechanism 30 for securing the dispersement plates 32 to the pressure plates 20, 22 in a non-fixed manner is shown, other connection mechanisms may be used provided that these connection mechanisms do not rigidly fix the dispersement plates 32 to the pressure plates 20, 22. Moreover, a greater number of connection mechanisms 30 may be used with each dispersement plate 32, the threaded connectors 42 may be secured to the dispersement plates 32 in a different manner than as specifically shown herein, the shapes of the dispersement plates 32 and flanges 34, 36 may vary, or the like.

Figure 6:
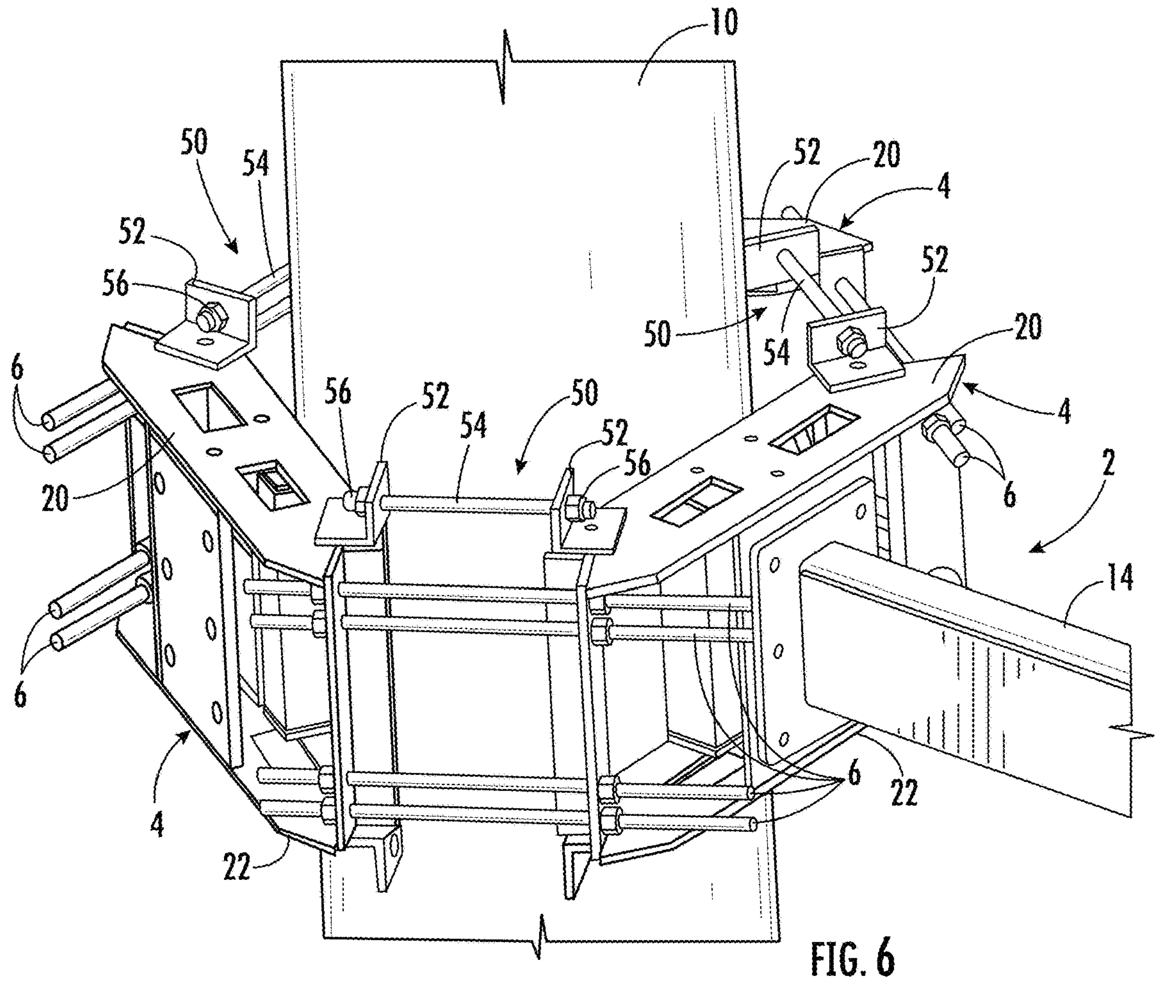
FIG. 6 is a perspective view of an exemplary collar mount according to another embodiment of the present invention mounted on a monopole.
Figure 7:
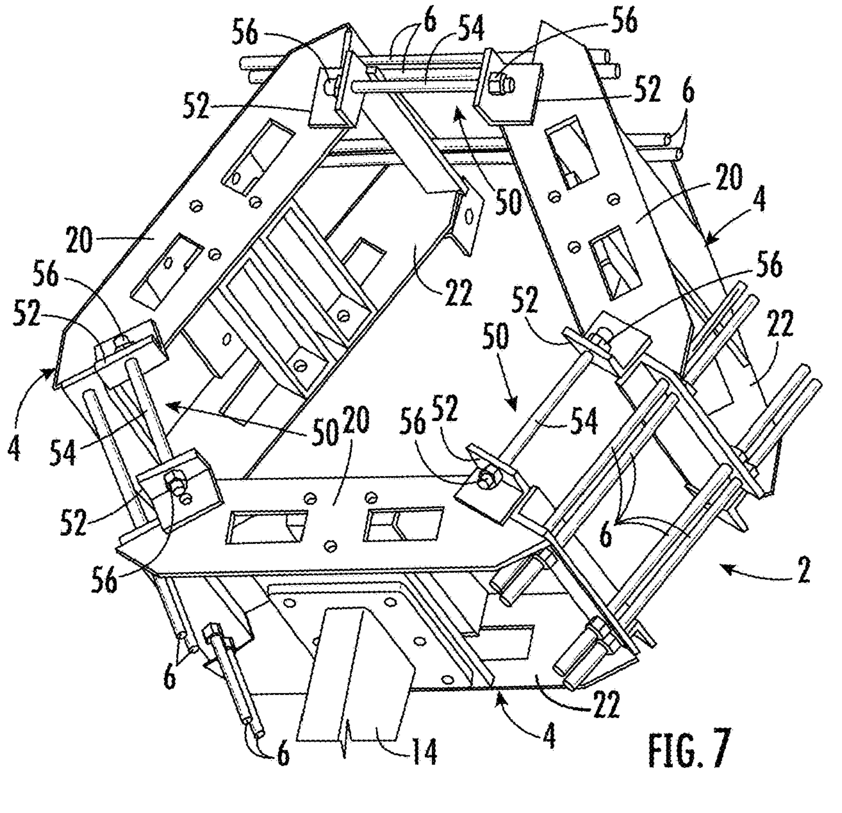
FIG. 7 is a perspective view of the collar mount of FIG. 6.

Another embodiment of a collar mount that operates to prevent the localized stresses caused by the tilting of the pressure members is shown in FIGS. 6 and 7. Like reference numerals are used to identify like components previously described with reference to FIGS. 1 through 3. In this embodiment, a separate top end connector 50 is used to connect the top ends of the pressure members 4 together. Use of the top end connector 50 helps to prevent the top ends of the pressure members 4 from tilting away from the monopole 10. As shown in FIGS. 6 and 7, two flanges 52 are mounted to the top side of each of the upper pressure plates 20. The flanges 52 are disposed near the lateral ends of the pressure plates 20 and are arranged such that each flange 52 of a first pressure member 4 faces a flange 52 of an adjacent pressure member 4. Each of the facing pairs of flanges 52 receive an end of a threaded member 54. A threaded connector 56 is threaded on each end of the threaded members 54 to the outside of flanges 52. The threaded member 54 is positioned at or above the top end of the pressure member 4. The top end of the pressure member 4 may be defined by the upper pressure plate 20 as is the case with the embodiment shown in FIGS. 6 and 7 where the threaded member 54 is positioned above the upper pressure plate 20. The threaded member 54 may be connected to the upper pressure plate 20 as shown in FIGS. 6 and 7. When the collar mount 2 is mounted on a monopole 10 the threaded connectors 56 are tightened on the threaded members 54 such that the upper pressure plates 20 are pulled into tight engagement with the monopole 10. The While separate flanges 52 are shown connected to the pressure plates 20, the flanges 52 may be made as one piece with the upper pressure plates 20. In the embodiment shown in FIGS. 6 and 7, in addition to the upper end connector 50, four threaded members 6 connect the adjacent pressure members 4 to one another rather than the two threaded members 6 shown in FIG. 1. The additional threaded members 6 also help to prevent the tilting of the pressure members 4 to thereby minimize the localized stresses created on the monopole 10.

Figure 8:
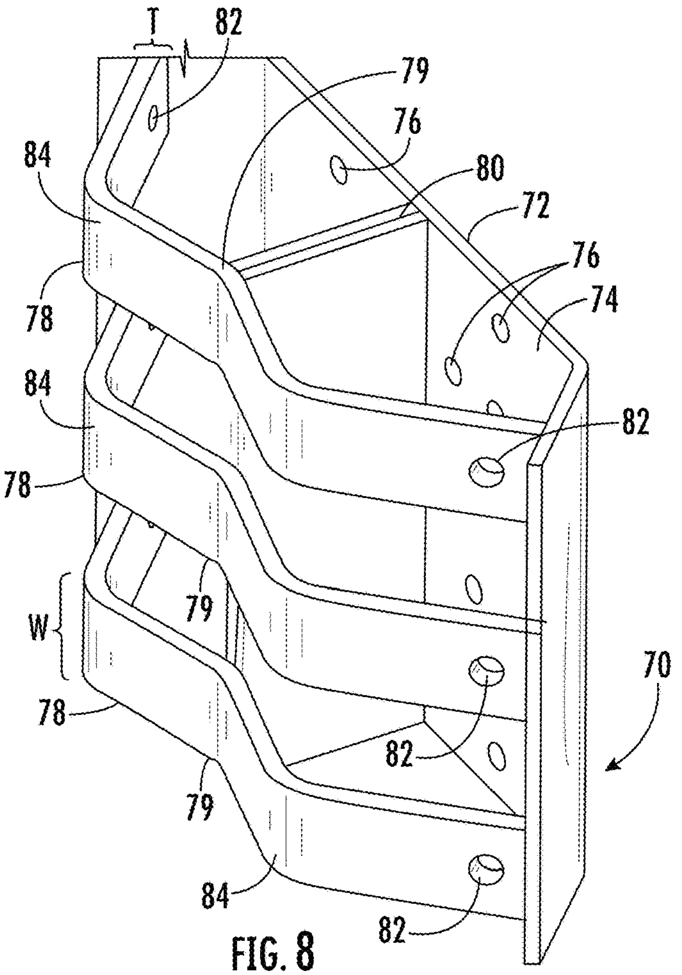
FIGS. 8 and 9 are perspective views of an exemplary pressure member for a collar mount according to another embodiment of the present invention.
Figure 9:
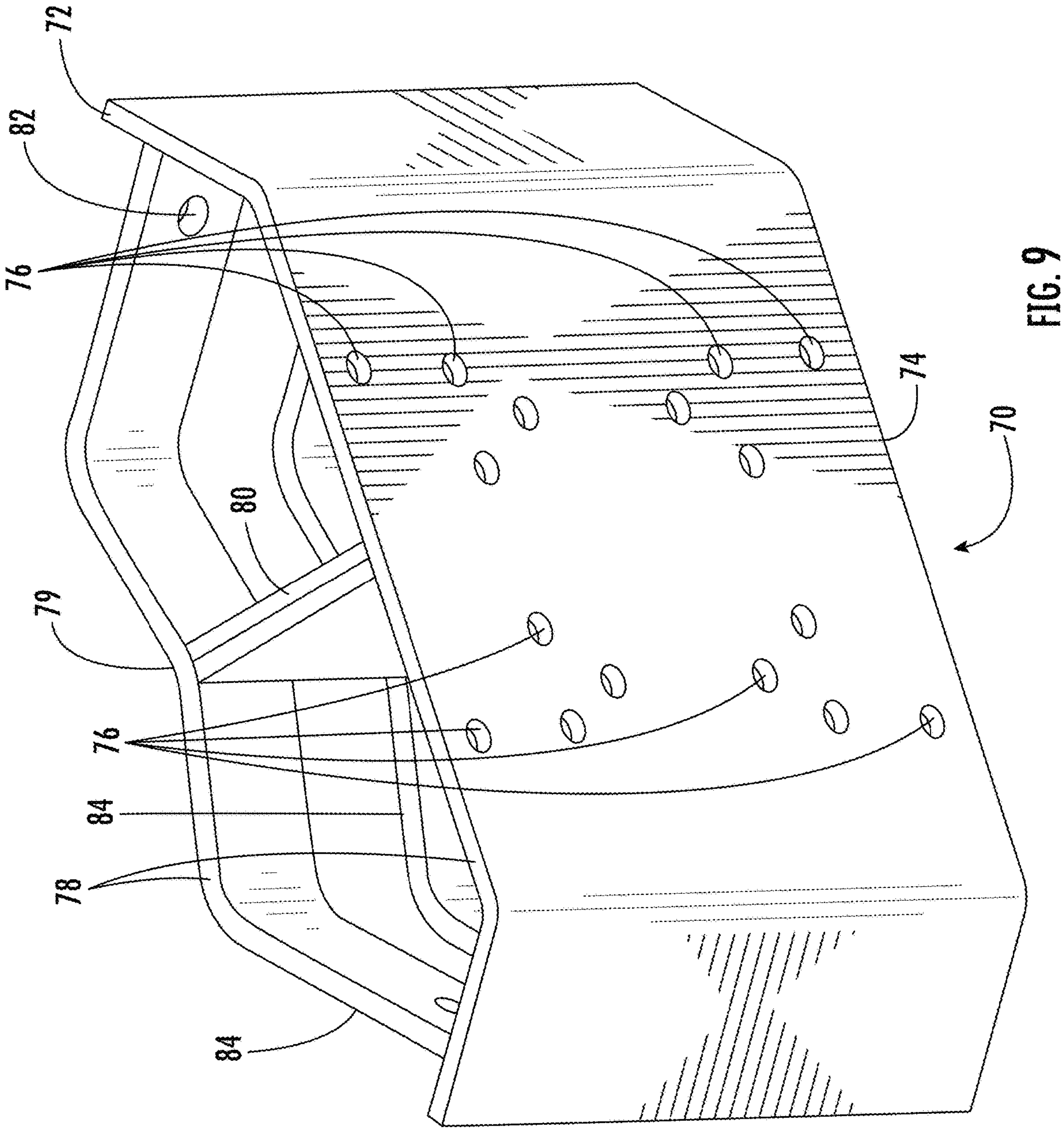

Another embodiment of a pressure member 70 usable with a collar mount 2 that functions to prevent the localized stresses caused by the tilting of the pressure members 4 is shown in FIGS. 8 through 10. In this embodiment, a larger contact area between the pressure member 70 and the monopole 10 is provided. The pressure member 70 comprises an exterior plate 72 that includes a connection area 74 for connecting the plate 72 to the standoff arm 14 such as described with respect to FIG. 1. The connection area 74 may include holes 76 for receiving bolts that connect the standoff arm 14 to the pressure member 70. A plurality of pressure plates 78 are connected to the exterior plate 72 where the pressure plates 78 face and contact the monopole 10 when the collar mount is installed. The pressure plates 78 have a shallow V-shape recess 79 that allows the pressure plates 78 to be connected to either a cylindrical monopole or a polygonal cylindrical monopole. Each pressure plate 78 have a width direction W that extends parallel to the monopole and a thickness direction T that extends perpendicular to the width direction and to the monopole 10 where the pressure plate 78 is significantly larger in the width direction W than in the thickness direction T.

A reinforcement rib 80 is provided between the exterior plate 72 and the pressure plates 78 to reinforce and prevent unwanted deflection of the pressure plates 78. The pressure plates 78 include apertures 82 for receiving threaded members 6 such that the pressure members 70 may be connected to the monopole 10 as previously described. Unlike the pressure plates 20, 22 of the previously described embodiments, the pressure plates 78 are arranged with the wider, flat surfaces 84 (rather than the narrow edge in the prior embodiments) facing the monopole 10. The flat surfaces 84 present a much larger surface area to monopole 10 than the leading edges 20*a*, 20*b* such that the forces on the monopole 10 are spread over a much larger surface area to thereby reduce localized stresses on the monopole 10. This is accomplished without using a single, large uninterrupted surface that requires that the pretension load generated by threaded members 6 to secure such a design to the monopole is greater than the load capacity of the monopole. In the embodiment of FIGS. 8 and 9 three pressure plates 78 are used and in the embodiment of FIG. 10 two pressure plates 78 are used. In the embodiment of FIG. 10, a reinforcement flange 90 is provided along each side of the plate 72. The reinforcement flange 90 may include additional apertures 82 for receiving additional threaded members 6.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as “under,” “below,” “lower,” “over,” “upper,” “top,” “bottom,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the example term “under” can encompass both an orientation of over and under. The device may be otherwise oriented (rotated 90 degrees or at other orientations) and the spatially relative descriptors used herein interpreted accordingly.

Herein, the terms “attached,” “connected,” “interconnected,” “contacting,” “mounted,” and the like can mean either direct or indirect attachment or contact between elements, unless stated otherwise.

Well-known functions or constructions may not be described in detail for brevity and/or clarity. As used herein the expression “and/or” includes any and all combinations of one or more of the associated listed items.

The terminology used herein is for the purpose of describing particular embodiments only and is not intended to be limiting of the present inventive concepts. As used herein, the singular forms “a,” “an,” and “the” are intended to include the plural forms as well, unless the context clearly indicates otherwise. It will be further understood that the terms “comprises,” “comprising,” “includes,” and/or “including” when used in this specification, specify the presence of stated features, operations, elements, and/or components, but do not preclude the presence or addition of one or more other features, operations, elements, components, and/or groups thereof.

The invention claimed is:

1. A collar mount, the collar mount comprising:

a plurality of pressure members, each of the plurality of pressure members comprising an upper pressure plate and a lower pressure plate each having a forward edge configured to engage a base station monopole at a pressure point;

a dispersement plate connected to each upper pressure plate and each lower pressure plate via a connection mechanism, each dispersement plate configured to be positioned at the pressure point between the forward edge of the respective pressure plate and the base station monopole; and wherein each connection mechanism is configured to hold the respective dispersement plate in non-rigidly fixed position relative to the respective pressure plate, thereby allowing the collar mount to be in a tilted position relative to the base station monopole while each dispersement plate is in a flush and parallel position with an outer surface of the base station monopole.

2. The collar mount according to claim 1, wherein the plurality of pressure members are spaced evenly about the collar mount.

3. The collar mount according to claim 1, wherein the plurality of pressure members are connected by a plurality of threaded members.

4. The collar mount according to claim 3, wherein at least one of the plurality of threaded members is connected between each two adjacent pressure members of the plurality of pressure members.

5. The collar mount according to claim 3, wherein two of the plurality of threaded members are connected between each two adjacent pressure members of the plurality of pressure members.

6. The collar mount according to claim 3, wherein four of the plurality of threaded members are connected between each two adjacent pressure members of the plurality of pressure members.

7. The collar mount according to claim 3, wherein a threaded connector engages each of the plurality of threaded members.

8. The collar mount according to claim 1, wherein the upper pressure plate and a lower pressure plate are configured to extend substantially perpendicular to the base station monopole.

9. The collar mount according to claim 1, wherein a support plate is connected between the upper pressure plate and the lower pressure plate.

10. The collar mount according to claim 9, wherein a standoff arm extends from the support plate.

11. The collar mount according to claim 1, wherein each dispersement plate comprises a relatively small, flat, rigid planar plate.

12. The collar mount according to claim 1, wherein the connection mechanism comprises a first flange and a second flange opposed to the first flange and a threaded member.

13. A collar mount, the collar mount comprising:

a plurality of pressure members;

a plurality of threaded members connecting the plurality of pressure members, wherein at least one of the plurality of threaded members is connected between each two adjacent pressure members of the plurality of pressure members;

each of the plurality of pressure members comprising a plurality of pressure plates, each of the pressure plates of a respective pressure member being coupled to an exterior plate, each of the plurality of pressure plates having a width direction extending parallel to a corresponding base station monopole and a thickness direction extending perpendicular to the width direction where the pressure plate is significantly larger in the width direction than in the thickness direction, wherein each of the plurality of pressure plates has a shallow recess configured to receive at least a portion of the corresponding base station monopole.

14. The collar mount according to claim 13, wherein the exterior plate provides a connection area for connecting the exterior plate to a standoff arm.

15. The collar mount according to claim 13, comprising a reinforcement rib between the exterior plate and the plurality of pressure plates.

16. The collar mount according to claim 13, wherein the plurality of pressure plates include a plurality of apertures for receiving one of the plurality of threaded members.

17. A collar mount, the collar mount comprising:

at least three pressure members, wherein adjacent pressure members are connected together via one or more threaded members;

each of the plurality of pressure members comprise an upper pressure plate and a lower pressure plate extending parallel to each other and coupled together via a support plate, the upper and lower pressure plates each having a forward edge configured to engage a base station monopole at a respective pressure point; and a plurality of dispersement plates, each dispersement plate positioned at the respective pressure points between the forward edges of the upper and lower pressure plates and the base station monopole, wherein each dispersement plate is non-rigidly connected to the respective upper and lower pressure plates.

18. The collar mount according to claim 17, wherein each dispersement plate comprises a connection mechanism for connecting the dispersement plate to the respective upper or lower pressure plate.

* * * * *